(12) United States Patent
Huang et al.

(10) Patent No.: US 9,693,289 B2
(45) Date of Patent: Jun. 27, 2017

(54) MODERATING COMMUNICATIONS WITHIN A WIRELESS TELECOMMUNICATIONS NETWORK BASED ON UE POWER SAVING MODES

(71) Applicant: Verizon Patent and Licensing Inc., Arlington, VA (US)

(72) Inventors: Ye Huang, San Ramon, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 31 days.

(21) Appl. No.: 14/667,290

(22) Filed: Mar. 24, 2015

(65) Prior Publication Data

US 2016/0286466 A1    Sep. 29, 2016

(51) Int. Cl.
| | |
|---|---|
| *H04W 72/00* | (2009.01) |
| *H04W 48/16* | (2009.01) |
| *H04W 76/04* | (2009.01) |
| *H04W 52/02* | (2009.01) |
| *H04W 4/12* | (2009.01) |

(52) U.S. Cl.
CPC ............ *H04W 48/16* (2013.01); *H04W 4/12* (2013.01); *H04W 52/0235* (2013.01); *H04W 76/046* (2013.01); *Y02B 60/50* (2013.01)

(58) Field of Classification Search
CPC ..... H04W 48/16; H04W 4/12; H04W 76/046; H04W 52/0235
USPC .......... 455/450–451, 452.1, 452.2, 572–574, 455/343.1, 343.2, 343.3, 343.4, 343.5
See application file for complete search history.

(56) References Cited

U.S. PATENT DOCUMENTS

| | | | | |
|---|---|---|---|---|
| 2012/0264443 | A1* | 10/2012 | Ng ........................ | H04W 4/005 455/450 |
| 2013/0223312 | A1* | 8/2013 | Ai ........................ | H04W 80/04 370/311 |
| 2016/0157276 | A1* | 6/2016 | Kim ...................... | H04W 76/06 455/450 |

* cited by examiner

*Primary Examiner* — Shahriar Behnamian

(57) ABSTRACT

Techniques described herein may enable a wireless telecommunications network to operate more efficiently by prohibiting communications towards User Equipment (UE) devices that are in a power saving mode. For example, a UE mode server may receive, from an information transfer server, a query regarding the availability of a particular UE to receive information. The UE mode server may determine whether the UE is currently in an active mode of operation or a power saving mode of operation. When the UE is in a power saving mode, the UE mode server may prohibit the information transfer server from having the information sent to the UE; however, when the UE is in an active mode, the UE mode server may permit the information transfer server to have the information to the UE.

20 Claims, 9 Drawing Sheets

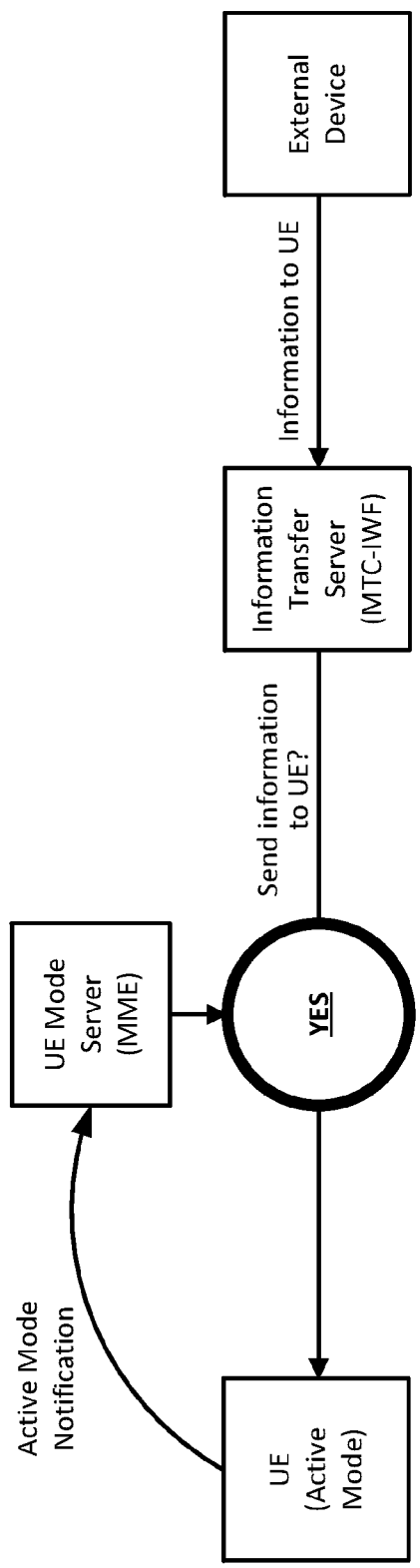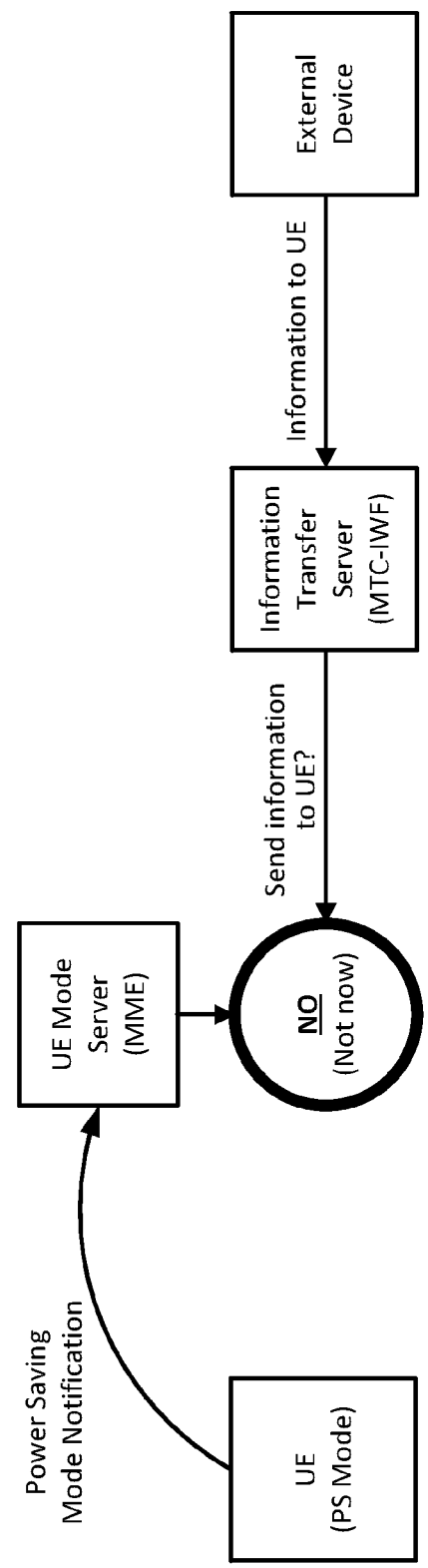

MODERATING COMMUNICATIONS WITHIN A WIRELESS TELECOMMUNICATIONS NETWORK BASED ON UE POWER SAVING MODES

BACKGROUND

A User Equipment (UE) may connect to a wireless network, such as a Long-Term Evolution (LTE) network. The UE may include a user device, such as a smartphone, a tablet computer, etc.; however, the UE may also include a range of other devices, such as a robot providing inventorying services in a warehouse or another remote, autonomous device. While the UE is in an active mode, the UE may receive information from external devices such as application servers that are also connected to the wireless network. Periodically, the UE may enter a power saving mode in order to conserve power and extend the battery life of the UE. Typically, while the UE is in the power saving mode, the UE cannot receive information from the external devices via the wireless network.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIGS. 1A and 1B illustrate an example overview of an implementation described herein;

DETAILED DESCRIPTION OF PREFERRED EMBODIMENTS

Figure 2:
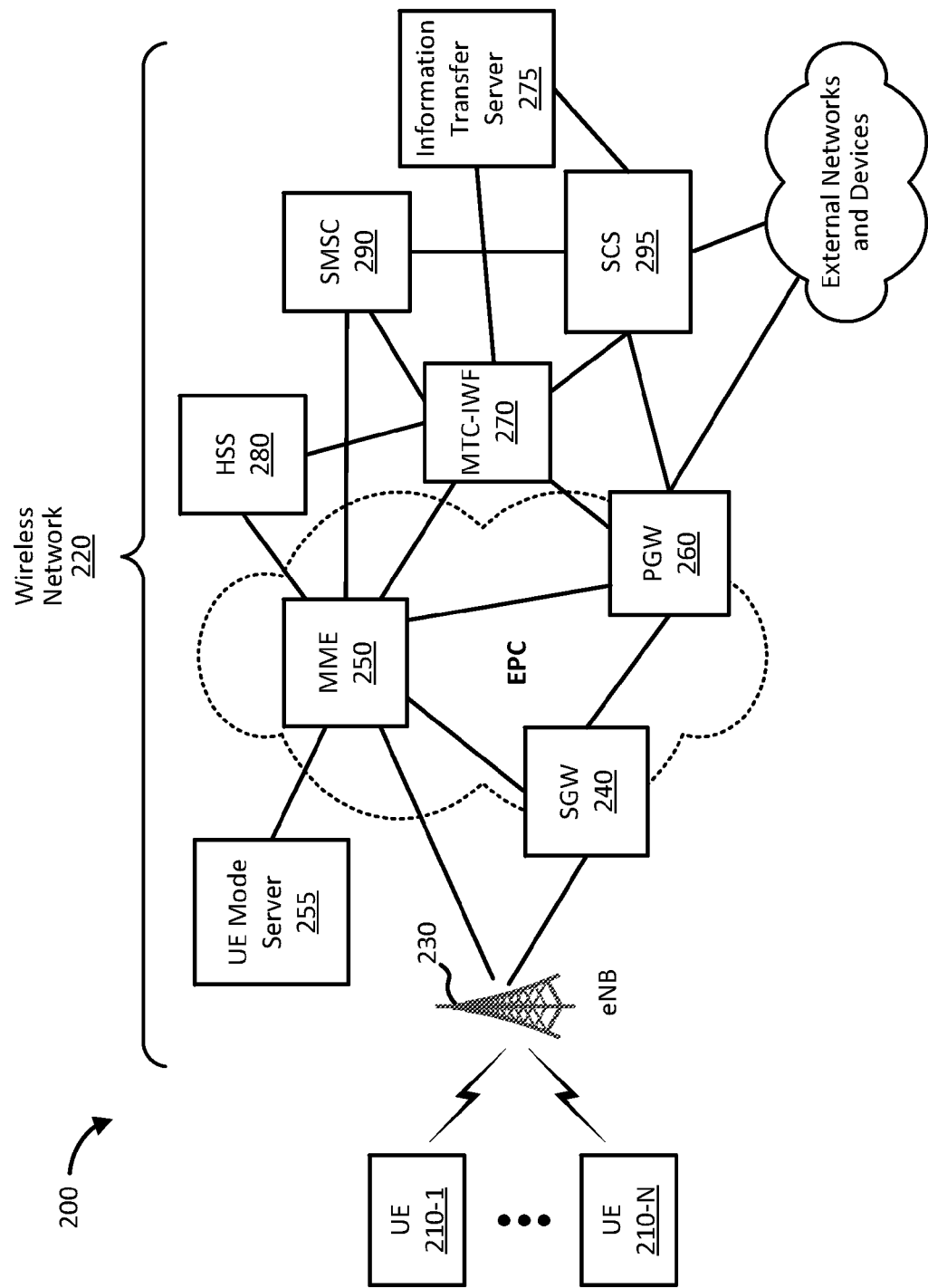
FIG. 2 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may enable a wireless network (e.g., an LTE network) to operate more efficiently by limiting communications within the network while a UE is in a power saving mode. For example, while a UE in an active mode may be able to receive information from devices that are external to the wireless network (e.g., application servers), a UE in a power saving mode may not be able to receive such information. Additionally, since external devices are not made aware of whether the UE is in an active mode or a power saving mode, the external devices may make repeated attempts to send information to the UE, even though the UE is unable to receive the information. As a result, the network may be unnecessarily encumbered by information intended for devices (e.g., UEs) that cannot receive the information. Alternatively, if the UE is scheduled to wake up for machine-transmitted data (or message) delivery, then the UE is deprived of an operation (i.e., a power saving mode) that conserves power and extends battery life.

Techniques described herein may relieve a wireless network of unnecessary communications by moderating network communications based on whether a UE is in a power saving mode. For instance, a UE may notify the network when the UE enters a power save mode, and the wireless network may prevent information from passing through the wireless network while the UE remains in a power saving mode (e.g., in order to avoid unnecessary network resource usage). Once the UE returns to an active mode, the wireless network may be notified so that information may once again flow from external devices (e.g., applications servers) to the UE (via the wireless network).

FIGS. 1A and 1B illustrate an example overview of an implementation described herein. As shown in FIG. 1A, an external device, such as an application server, may communicate with an information transfer server (which may include a Machine Type Communications (MTC) Interworking Function (MTC-IWF) server, or a device in communication with an MTC-IWF server) in order to send information to a UE. The information transfer server may communicate with a UE mode server (which may include a Mobility Management Entity (MME), or a device in communication with an MME) to determine whether the information from the external device should be sent to the UE. The UE mode server may determine whether the UE is currently in an active mode based on information received from the UE, and, if the UE is in fact in an active mode, the UE mode server may permit the information to be sent to the UE by indicating to the information transfer server that the UE is available. In the alternative, as shown in FIG. 1B, if the UE is currently in a power saving mode, the UE mode server may prevent the information from being sent to the UE by indicating to the information transfer server that the UE is currently unavailable.

The overview described above may be implemented in a variety of ways. For instance, in some implementations, the information transfer server must proactively query the UE mode server regarding the availability of a particular UE (e.g., periodically or intermittently, and/or when there is traffic for the UE). However, in some implementations, the information transfer server may subscribe to the UE mode server for status updates regarding the availability of the UE. Additionally, in some implementations, the information transfer server may store the information received from the external device until the UE becomes available, and then send the information to the UE once the UE becomes active. In yet some implementations, the information transfer server may instruct the external device to send the information at a later time (e.g., after a given period of time, after the UE mode server informs the information transfer server that the UE as returned to an active mode, etc.).

FIG. 2 is a diagram of an example environment 200 in which systems and/or methods described herein may be implemented. Environment 200 may include UE 210-1 through UE 210-N (where N is an integer greater than 1) and wireless network 220.

In FIG. 2, wireless network 220 may include an Evolved Packet System (EPS) that includes a LTE network and/or an evolved packet core (EPC) network that operates based on a 3rd Generation Partnership Project (3GPP) wireless communication standard. The LTE network may be, or may include, a radio access network that includes one or more base stations, some or all of which may take the form of Enhanced Node B (eNB) 230, via which UEs 210 may communicate with the EPC network. The EPC network may include Serving Gateway (SGW) 240, Mobility Management Entity (MME) 250, and/or Packet Data Network (PDN) Gateway (PGW) 260.

The EPC network may enable UEs 210 to communicate with an external network, such as a Public Land Mobile Networks (PLMN), a Public Switched Telephone Network (PSTN), and/or an Internet Protocol (IP) network (e.g., the Internet). Additionally, wireless network 220 may include UE mode server 255, MTC-IWF server 270 (also referred to herein as simply MTC-IWF 270), Home Subscriber Server (HSS) 280, Short Message Service Center (SMSC) 290, and Service Capability Server (SCS) 295. Environment 200 may also include information transfer server 275.

UE 210 may each include a portable computing and communication devices, such as a personal digital assistant (PDA), a smart phone, a cellular phone, a laptop computer with connectivity to a wireless telecommunications network, a tablet computer, etc. UE 210 may also include non-portable computing devices, such as desktop computers, consumer or business appliances, or other devices that have the ability to connect to wireless network 220. In some implementations, UE 210 may also, or alternatively, include one or more autonomous devices, such as a robot, a self-driving vehicle, etc., capable of connecting and communicating with wireless network 220. UE 210 may connect, through a radio link, to wireless network 220.

eNB 230 may include one or more network devices that receive, process, and/or transmit traffic destined for and/or received from UE 210 (e.g., via an air interface). SGW 240 may aggregate traffic received from one or more eNBs 230 and may send the aggregated traffic to an external network or device via PGW 260. Additionally, SGW 240 may aggregate traffic received from one or more PGWs 260 and may send the aggregated traffic to one or more eNBs 230.

MME 250 may include one or more computation and communication devices that act as a control node for eNB 230 and/or other devices that provide the air interface for wireless network 220. For example, MME 250 may perform operations to register UE 210 with wireless network 220, to establish bearer channels (e.g., traffic flows) associated with a session with UE 210, to hand off UE 210 to a different eNB, MME, or another network, and/or to perform other operations. MME 250 may perform policing operations on traffic destined for and/or received from UE 210.

UE mode server 255 may include one or more computation and communication devices that act to determine an operational status of UE 210 (e.g., whether UE 210 is in an active mode, a power saving mode, etc.) and regulate the flow of information from information transfer server 275 or SCS 295 to UE 210, based on the operational status of UE 210. As shown, UE mode server 255 may be implemented as a device connected to MME 250. However, in other implementations, UE mode server 255 and/or the functionality of UE mode server 255, as described herein, may be incorporated into MME 250. For instance, as described below with reference to FIG. 7 and FIG. 8, some or all of the functions described in this specification as being performed by UE mode server 255 may be incorporated into MME 250.

PGW 260 may include one or more network devices that may aggregate traffic received from one or more SGWs 240, and may send the aggregated traffic to an external network. PGW 260 may also, or alternatively, receive traffic from the external network and may send the traffic toward UE 210 (via SGW 240 and/or eNB 230). In some implementations, PGW 260 may provide a pathway (in combination with SGW 240 and/or eNB 230) for communicating information from information transfer server 275 and/or SCS 295 to UE 210.

MTC-IWF 270 may include one or more server devices that facilitate machine-to-machine (M2M) communications within wireless network 220. In some implementations, MTC-IWF 270 may do so by centralizing communications of various devices within wireless network 220. For example, wireless network 220 may include multiple SCSs 295 attempting to send information to UE 210. As such, each SCS 295 may coordinate with MTC-IWF 270 in order to send information to UE 210. Additionally, MTC-IWF 270 may send the information, or cause the information to be sent, from SCSs 295 to UE 210 using SMSC 290.

Information transfer server 275 may include one or more computation and communication devices that act to communicate with UE mode server 255 to determine whether information should be sent from SCS 295 and/or MTC-IWF 270 to UE 210. In some implementations, prior to verifying that UE 210 is available for receiving information from SCS 295, SCS 295 may communicate (e.g., via 270) information intended for UE 210 to information transfer server 275, and information transfer server 275 may buffer the information until UE 210 becomes available. Once UE 210 becomes available, information transfer server 275 may forward the information to UE 210 (possibly via SMSC 290). As shown, information transfer server 275 may be implemented as a device connected to MTC-IWF 270. However, in other implementations, information transfer server 275 and/or the functionality of information transfer server 275, as described herein, may be incorporated into MTC-IWF 270. For instance, as described below with reference to FIG. 7 and FIG. 8, functions described elsewhere in this specification as being performed by information transfer server 275 may be incorporated into MTC-IWF 270. In some implementations, MTC-IWF 270 may communicate with MME 250 and/or UE mode server 255 over one or more network interfaces, such as a T5b interface in the 3GPP standard (see, e.g., 3GPP TS 23.682 v11.2.0).

HSS 280 may include one or more devices that may manage, update, and/or store, in a memory associated with HSS 280, profile information associated with a subscriber (e.g., a subscriber associated with UE 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 210. Additionally, or alternatively, HSS 270 may perform authentication, authorization, and/or accounting operations associated with the subscriber and/or a communication session with UE 210. In some implementations, HSS 280 may also, or alternatively, operate as a Home Location Register (HLR) and/or an Authentication, Authorization, and Accounting (AAA) server.

SMSC 290 may include one or more server devices that store, forward, convert and deliver Simple Message Service (SMS) messages within wireless network 220. For instance, when an SMS message is sent from one UE 210 to another UE 210, the SMS message may reach SMSC 290 first. SMSC 290 may then forward the SMS message towards the intended UE 210 with appropriate routing information. If the receiving UE 210 is unavailable (for example, when the UE is switched off), SMSC 290 may store the SMS message and forward the SMS message when the intended UE 210 is available (so long as the message's expiry period is not lapsed). In a similar manner, information from information transfer server 275 and/or MTC-IWF 270, to UE 210, may be communicated via SMSC 290.

SCS 295 may include one or more network devices (e.g., servers) that may aggregate traffic received from one or more external devices, such as application servers, and may send the aggregated traffic to other devices, such as UE 210, PGW 260, MTC-IWF 270, information transfer server 275, etc. SCS 295 may help ensure network security and integrity by providing identification and/or authentication services for the external devices. As described herein, SCS 295 may collaborate with information transfer server 275 (and by extension MME 250) to communicate information from external devices (e.g., application servers) to UE 210 when UE 210 is operating in an active mode. As an alternative, a third-party content server outside network 220 may perform one or more of the functions of SCS 295. In some implementations, SCS 295 may operate in accordance with European Telecommunications Standards Institute (ETSI) TS 123 198 v8.0.0.

Figure 3:
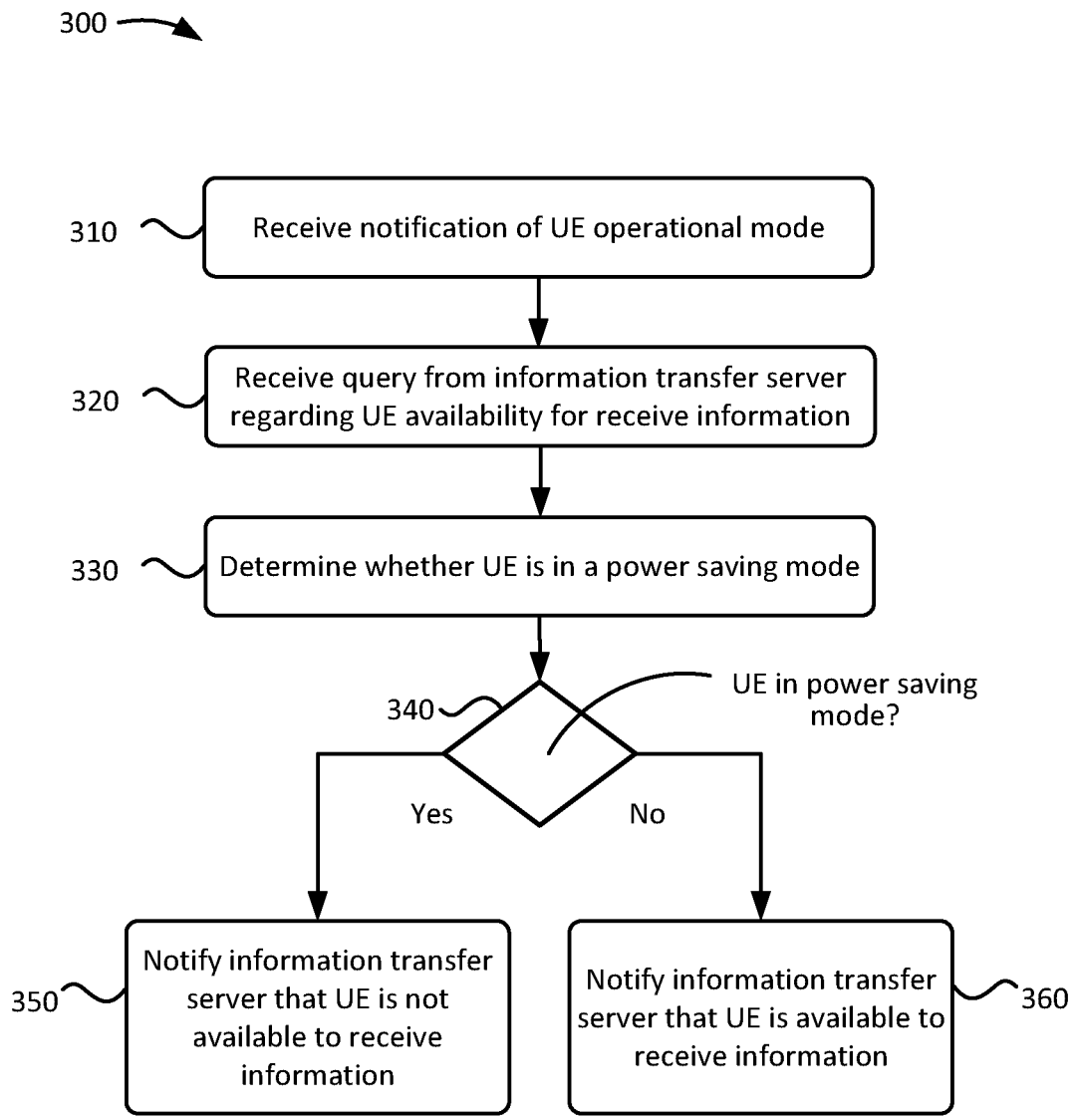
FIG. 3 is a flow chart illustrating an example process for moderating communications within a wireless network based on a query as to whether a User Equipment (UE) is in a power saving mode.

FIG. 3 is a flow chart illustrating an example process 300 for moderating communications within wireless network 220 based on a query as to whether UE 210 is in a power saving mode. Process 300 may be implemented by UE mode server 255 (which may, in some implementations, be incorporated into MME 250).

Process 300 may include receiving a notification of UE 210 entering a power saving mode (block 310). For example UE mode server 255 may receive a notification from UE 210 that UE 210 has entered a power saving mode. The notification may include a Radio Resource Control (RRC) Release procedure, a Tracking Area Update (TAU) procedure, or another type procedure. The power saving mode may include a mode of operation where UE 210 maintains limited functionality in order to, for example, preserve battery life. As described below in greater detail with reference to FIGS. 7 and 8, the power saving mode may include the time between, and/or involving, an attach procedure, an RRC Release procedure (with respect UE 210), and a RRC Establishment procedure followed by a TAU procedure.

Process 300 may include receiving a query from information transfer server 275 regarding the availability of UE 210 to receive information (block 320). For example, UE mode server 255 may receive an inquiry from information transfer server 275 as to whether a particular UE 210 is in a power saving mode. The query may include an identifier (e.g., an MDN, an IP address, an International Mobile Subscriber Identity (IMSI), etc.) of UE 210. In some implementations, UE mode server 255 may receive the query in response to information transfer server 275 and/or another device (e.g., SCS 295) attempting to send information to UE 210.

Process 300 may include determining whether UE 210 is in a power saving mode (block 330). For example, UE mode server 255 may determine whether UE 210 is in a power saving mode based on information received from UE 210 (see block 310). For instance, UE mode server 255 may determine that UE 210 is in a power saving mode based on an indication that UE is in an idle mode or based on whether one or more network procedures (an RRC Release procedure, an RRC Establishment, a TAU procedure, etc.) have recently been performed with respect to UE 210. UE mode server 255 may determine whether UE 210 is in a power saving mode based on the UE identifier received from information transfer server 275.

If UE mode server 255 determines that UE 210 is in a power saving mode (block 340—Yes), UE mode server 255 may proceed by notifying information transfer server 275 that UE 210 is not available to receive information (block 350). However, if UE mode server 255 determines that UE 210 is not in a power saving mode (e.g., that UE 210 is in an active mode) (block 340—No), UE mode server 255 may proceed by notifying information transfer server 275 that UE 210 is not in a power saving mode (e.g., available to receive information) (block 360). As described below with reference to FIGS. 5 and 6, information transfer server 275 may decide whether to have information sent to UE 210 based on the notification from UE mode server 255 as to whether UE 210 is currently available to receive information.

Figure 4:
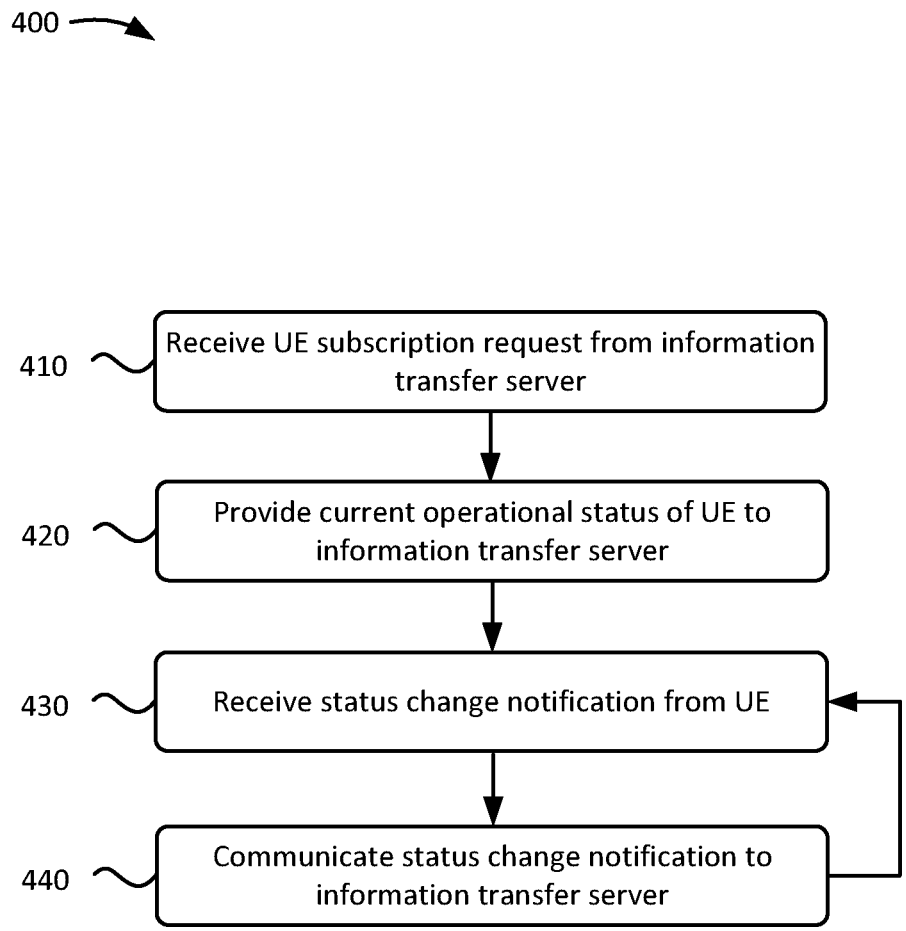
FIGS. 4-7 are flow charts illustrating an example process for moderating communications within a wireless network based on a subscription regarding whether a UE is in a power saving mode.

FIG. 4 is a flow chart illustrating an example process 400 for moderating communications within wireless network 220 based on a subscription regarding whether UE 210 is in a power saving mode. Process 400 may be implemented by UE mode server 255 (which may, in some implementations, be incorporated into MME 250).

As shown, process 400 may include receiving a UE subscription request from information transfer server 275 (block 410). For example, UE mode server 255 may receive a request from information transfer server 275 (e.g., via a T5b interface) to be notified of the current operational status of UE 210 (e.g., active mode or power saving mode) and any subsequent changes to the operational status of UE 210. In some implementations, UE mode server 255 may respond to the UE subscription request by creating a logical association between UE 210 and information transfer server 275 such that any changes in the operational status of UE 210 will be communicated (e.g., pushed) to information transfer server 275.

Process 400 may include providing a current operational status of UE 210 to information transfer server 275 (block 420). For instance, UE mode server 255 may determine whether UE 210 is currently in an active mode of operation or a power saving mode of operation and may notify information transfer server 275 of the operational status of UE 210. In some implementations, UE mode server 255 may also notify information transfer server 275 that the UE subscription request has been received and processed, such that information transfer server 275 will be notified of changes to the operational status of UE 210.

Process 400 may include receiving a status change notification from UE 210 (block 430). For example, UE mode server 255 may receive information from UE 210 indicating a change in the operational status of UE 210. The information may correspond to an RRC Release procedure, a TAU procedure, or another type procedure. The power saving mode may also include a mode of operation where UE 210 maintains limited functionality in order to, for example, preserve battery life. As described below in greater detail with reference to FIGS. 7 and 8, the power saving mode may include the time between a RRC Release procedure (with respect UE 210) and a RRC Establishment procedure followed by a TAU procedure.

Process 400 may include communicating a status change notification to information transfer server 275 (440). For example, UE mode server 255 may notify information transfer server 275 of changes to the operational status of UE 210. Depending on the scenario, the change in the operational status may include a notification that UE 210 has entered a power saving mode or an active mode. As described below with reference to FIGS. 5 and 6, information transfer server 275 may determine whether to allow information to be sent to UE 210, based on the notification from UE mode server 255. Additionally, depending on the implementation, the subscription may automatically terminate once UE 210 returns to an active mode, or may continue on even after UE 210 returns to an active mode.

Figure 5:
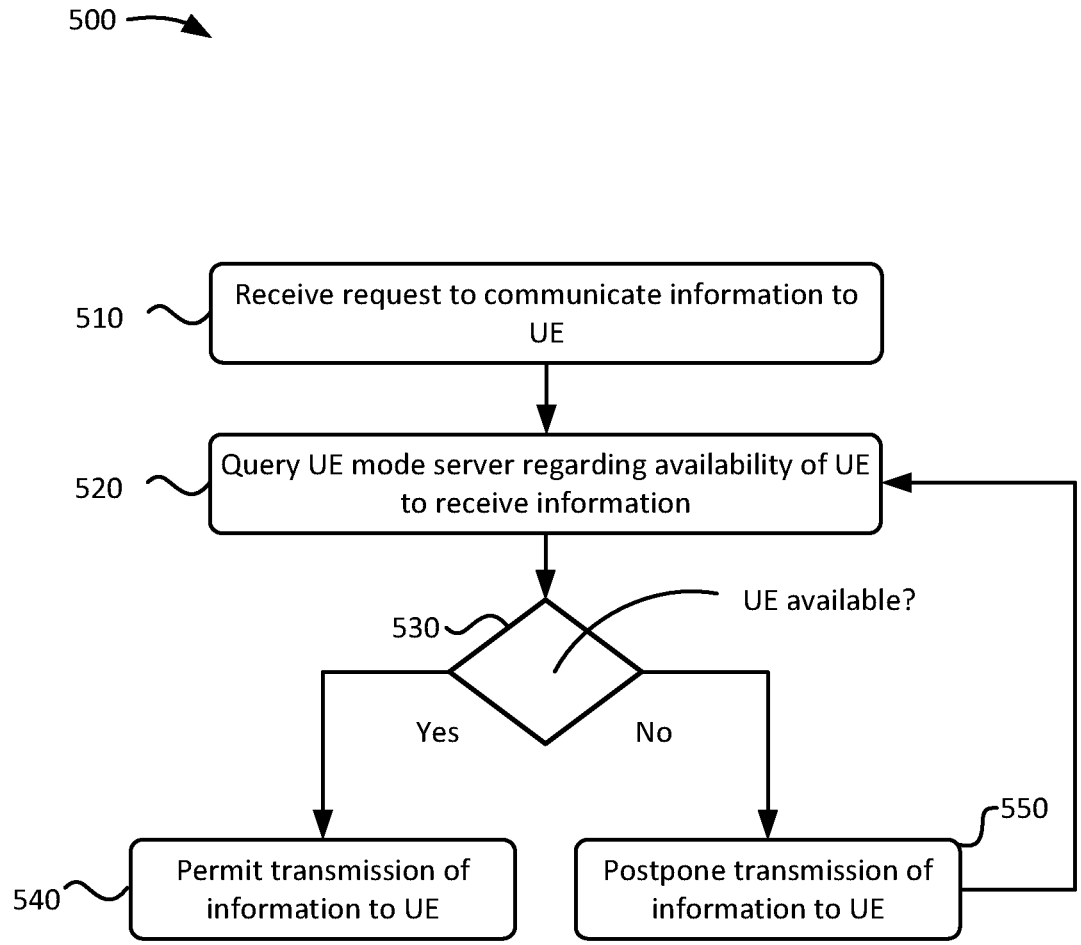

FIG. 5 is a flow chart illustrating another example process 500 for moderating communications within wireless network 220 based on a query as to whether UE 210 is in a power saving mode. Process 500 may be implemented by information transfer server 275 (which may, in some implementations, be incorporated into MTC-IWF 270).

As shown, process 500 may include receiving a request to communicate information to UE 210 (block 510). For example, information transfer server 275 may receive a request from SCS 295 (or application servers connected to SCS 295) to send information to UE 210. In some implementations, the request may include an identity (e.g., an MDN, an IP address, an IMSI, etc.) of UE 210 and/or content information. For instance, the request may include a mere request for permission for SCS 295 to send information to UE 210. Alternatively, the request may include the actual information (e.g., content) that is to be send to UE 210. In scenarios where the request includes the actual information to be sent to UE 210, information transfer server 275 may buffer the information so that it can be sent later by information transfer server 275.

Process 500 may include querying UE mode server 255 regarding the availability of UE 210 to receive information (block 520). For instance, information transfer server 275 may send a query to UE mode server 255 to determine whether UE 210 is available to receive information originating from SCS 295 or another device. In some implementations, the query may include an identifier of UE 210 in order to, for example, assist UE mode server 255 in determining the availability (e.g., operational status) of the UE 210 of interest. As discussed above with reference to FIG. 3, UE mode server 255 may respond to the query with the current operational status of UE 210 and/or with an indication of whether UE 210 is currently available to receive information. In some implementations, prior to issuing the query to UE mode server 255, information transfer server 275 may contact HSS 280 to identify which UE mode server 255 (and/or MME 250) is currently managing, and/or would have the current status of, UE 210.

If UE 210 is available to receive information (block 530—Yes), information transfer server 275 may permit the transmission of information to UE 210 (block 540). In some implementations, this may include informing the device (e.g., SCS 295) that sent the initial request (see, e.g., block 510) that the device may proceed by sending the information to UE 210. In some implementations (e.g., implementations where the information was buffered by information transfer server 275) this may include information transfer server 275 sending the information to UE 210.

If UE 210 is unavailable to receive information (block 530—No), information transfer server 275 may postpone the transmission of the information to UE 210 (block 550). In some implementations, information transfer server 275 may postpone the sending of the information to UE 210 by informing the device (e.g., SCS 295) that sent the initial request (see, e.g., block 510) that the device is not currently permitted to send the information to UE 210. In some implementations, information transfer server 275 may postpone the sending of the information to UE 210 by storing information received as part of the initial request (see, e.g., block 510) in a buffer memory for later transmission. As shown in FIG. 5, if transmission of the information to UE 210 is postponed (block 550), process 500 may later return (e.g., after a pre-selected amount of time or an amount of time indicated by UE mode server 255) to query UE mode server 255 as to whether UE 210 is available to receive the information (block 520). In addition, information transfer server 275 may provide feedback to SCS 295 about postponing the transmission of the information and/or the buffering of the information.

Figure 6:
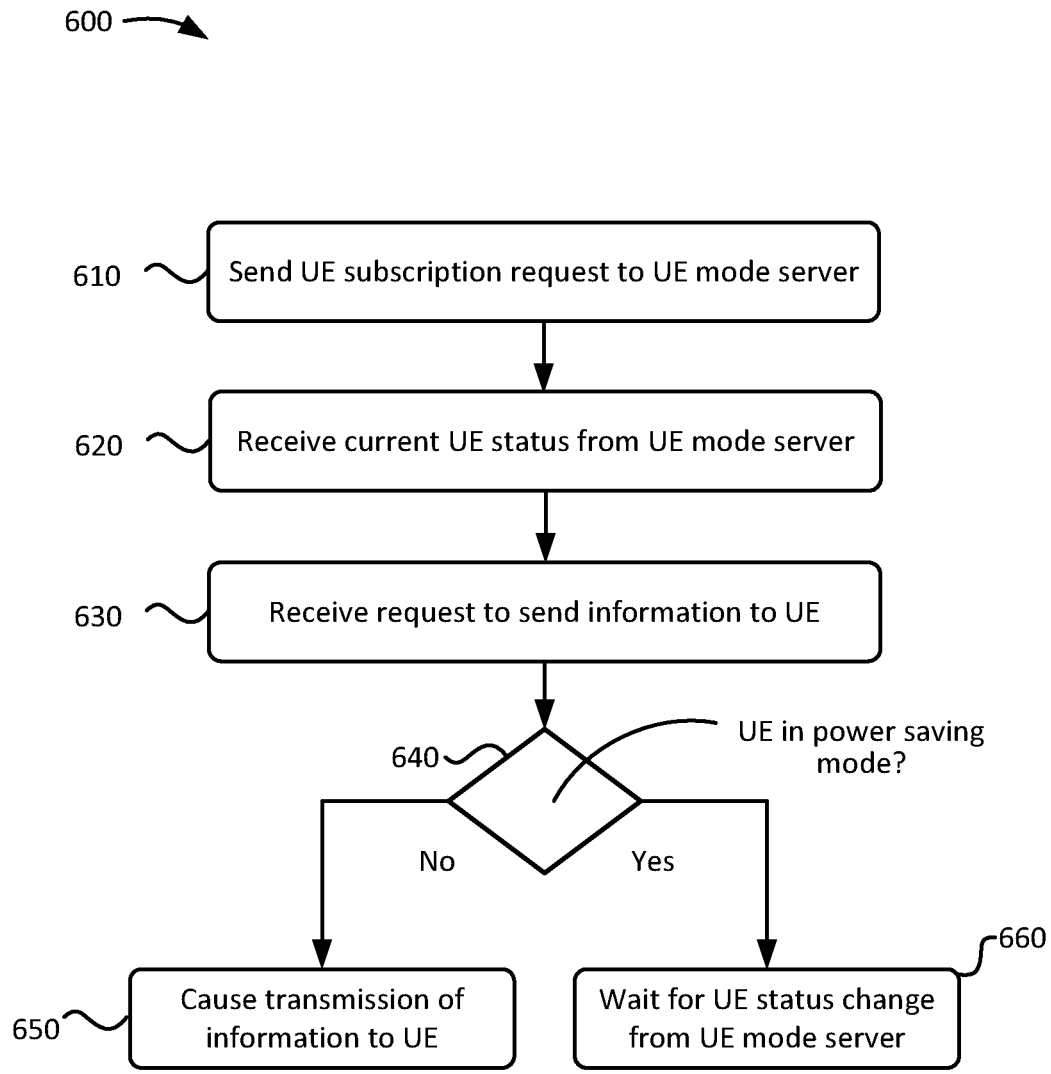

FIG. 6 is a flow chart illustrating another example process for moderating communications within wireless network 220 based a subscription regarding whether UE 210 is in a power saving mode. Process 600 may be implemented by information transfer server 275 (which may, in some implementations, be incorporated into MTC-IWF 270).

As shown, process 600 may include sending a UE subscription request to UE mode server 255 (block 610). For example, information transfer server 275 may send a request to UE mode server 255 to establish a subscription regarding the current operational status of UE 210 and subsequent changes in the operational status of UE 210. In some implementations, information transfer server 275 may not need to know the actual operational status of UE 210 (e.g., whether UE 210 is in power saving mode or active mode), and therefore the subscription may instead be to know the availability of UE 210 to receive information via wireless network 210 (e.g., available or unavailable). The subscription may last for a default period of time, a duration of time specified by information transfer server 275, or until the information is actually sent to UE 210.

Process 600 may include receiving a current UE status from UE mode server 255 (block 620). For instance, information transfer server 275 may be updated regarding the operational status of UE 210 (e.g., whether UE 210 is in a power saving mode or an active mode). In some implementations, the status updates may be pushed from UE mode server 255 to information transfer server 275.

Process 600 may include receiving a request to send information to UE 210 (block 630). For example, information transfer server 275 may receive a request from SCS 295, or another device (e.g., an application server), to send information to UE 210. In some implementations, the request may include an identity of UE 210 and/or content information. For instance, the request may include a mere request for permission for SCS 295 to send information to UE 210. Alternatively, the request may include the actual information that is to be send to UE 210. In scenarios where the request includes the actual information to be sent to UE 210, information transfer server 275 may buffer the information so that it can be sent later by information transfer server 275.

If the UE is not currently in a power saving mode (block 640—No), information transfer server 275 may cause the information to be sent to UE 210 (block 650). For instance, if information transfer server 275 has buffered the information from the request (see, e.g., block 610), information transfer server 275 may send the information to UE 210. However, if information transfer server 275 does not have the information, information transfer server 275 may inform the device requesting to send the information (e.g., SCS 295, an application server, etc.) that the information can be sent to UE 210.

If UE 210 is currently in a power saving mode (block 640—Yes), information transfer server 275 may wait for a status change from UE mode server 255 (block 660). For instance, if information transfer server 275 is currently storing (e.g., buffering) the information intended for UE 210, information transfer server 275 may continue to store the information until UE 210 enters and active mode. Alternatively, if information transfer server 275 is not storing the information, information transfer server 275 may inform the device intending to send the information to UE 210 (e.g., SCS 295, application server, etc.) to wait until UE 210 is able to receive the information. In some implementations, the subscription may end when the information is sent to UE 210. In some implementations, the subscription may continue even after the information is sent to UE 210.

Figure 7:
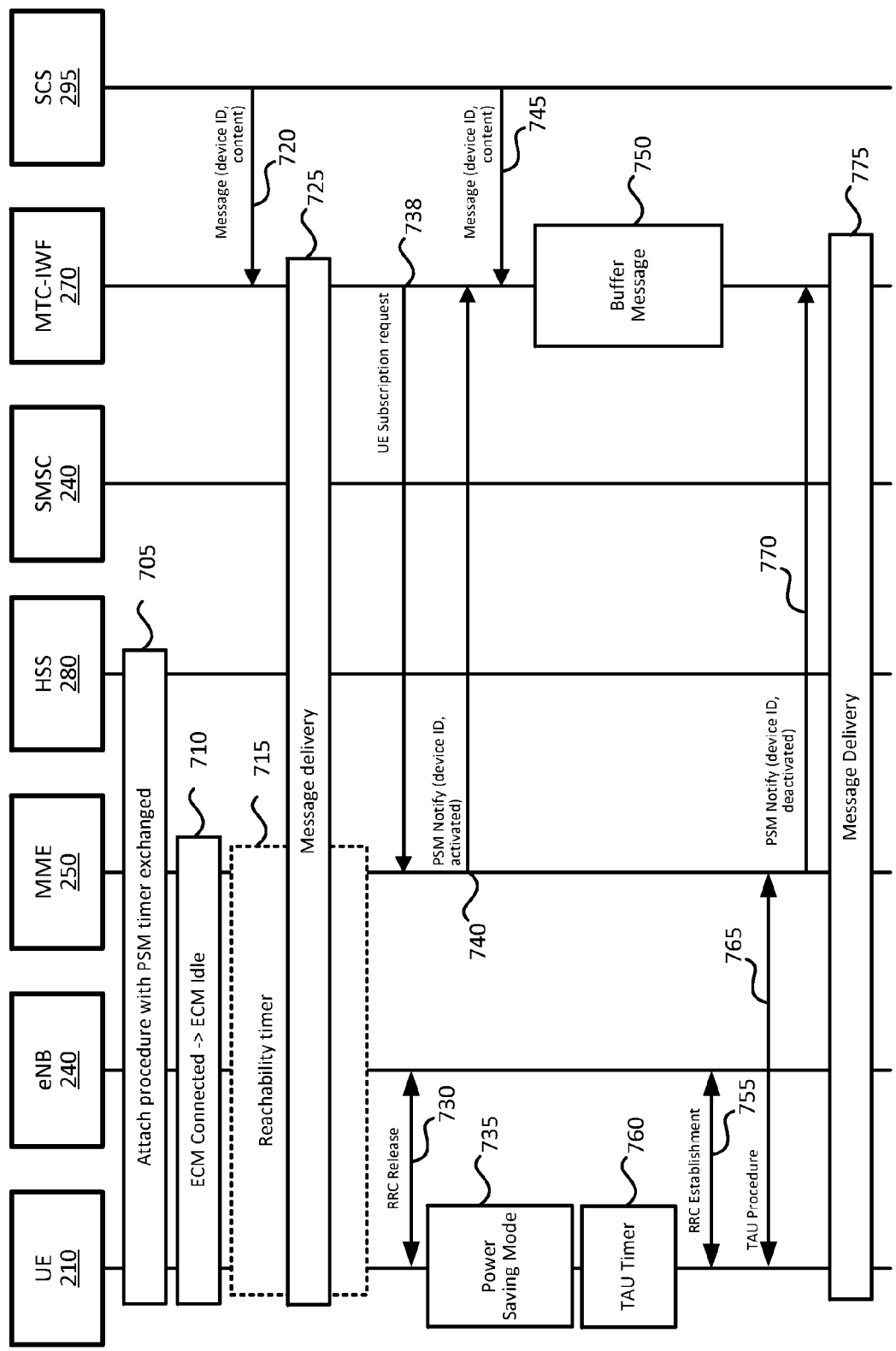

FIG. 7 is a signal flow diagram illustrating an example of moderating communications within wireless network 220 based on a power saving mode of UE 210. The signal flow diagram of FIG. 7 may include a technique for moderating communications with a subscription-type approach to UE availability. Additionally, in FIG. 7, the functionality of UE mode server 255 has been incorporated into MME 250, and the functionality of information transfer server 275 has been incorporated into MTC-IWF 270, in order to illustrate how the functionality of UE mode server 255 and information transfer server 275 may be integrated into other types of network devices.

As shown in FIG. 7, an attachment procedure may be performed (block 705) in order to connect UE 210 to a wireless network (e.g., wireless network 220). During the attachment procedure, UE 210 and MME 250 may establish conditions and durations for UE 210 being in an active mode and a power saving mode. For instance, UE 210 and MME 250 may establish a reachability timer representing the amount of time between UE 210 entering an idle mode and UE entering a power saving mode. The reachability timer may begin with a particular event, such as UE 210 transitioning from an EPS Connection Management (ECM) CONNECTED state to an ECM IDLE state. Similarly, UE 210 and MME 250 may establish a power saving mode timer representing the amount of time UE 210 will remain in a power saving mode before returning to an active mode (which may be marked by one or more events such as UE 210 establishing an RRC connection and initiating a TAU procedure).

At some point after the attachment procedure is complete, UE 210 may undergo a transition from an ECM CONNECTED state to an ECM IDLE state (block 710). During an ECM CONNECTED state, UE 210 may be registered with MME 250 and have an active RRC connection with wireless network 220. During an ECM IDLE state, UE 210 may still be registered with MME 250 but the RRC connection with wireless network 220 may be idle. Entering the ECM IDLE state may initiate the reachability timer for UE 210 (block 715). At some point during the ECM IDLE state of UE 210, SCS 295 (or another device) may attempt to send information to UE 210. As such, SCS 295 may communicate a message to MTC-IWF 270, which may include a device identifier (ID) of UE 210 and message content (line 720). Since the message is being sent during the reachability timer (e.g., before UE 210 has entered a power saving mode), the message may be sent to UE 210 (block 725).

Once the reachability timer has expired, UE 210 may undergo an RRC Release procedure (line 730) and may enter a power saving mode (block 735). At some point, MTC-IWF 270 may send a UE subscription request to MME 250 in order to receive periodic updates regarding the operational mode of UE 210 (line 738). In some implementations, the UE subscription request may be sent due to a request (see, e.g., line 720), or a pattern of requests, to send information to UE 210. In response to the UE subscription request, MME 250 may send a notification to MTC-IWF 270 of UE 210 being in a power saving mode (line 740).

At some point during the power saving mode, SCS 295 may send a request to MTC-IWF 270 to send another message to UE 210 (line 745). Similar to the previous message, the new message may include a device ID of UE 210 and message content. Since MTC-IWF 270 has received an indication that UE 210 is currently unavailable, MTC-IWF 270 may store the message locally in a buffer (block 750). In the depicted implementation, after UE 210 exits the power saving mode, a TAU timer may still be running (760) (which may be viewed by MME 250 as part of the overall power saving mode). However, after the TAU timer expires, UE 210 may establish an RRC connection with eNB 230 (block 755) and initiate a TAU procedure with MME 250 (block 765), indicating that UE 210 is active. Once the UE 210 is once again in an active mode, MME 250 may notify MTC-IWF 270 (line 770), and MTC-IWF 270 may communicate the buffered message to UE 210 (block 775).

In some implementations, the example depicted in FIG. 7 may include additional, fewer, and/or alternative devices/entities than those depicted. For instance, in some implementations, a user plane data path may be created that involves an SGW, PGW, MTC-IWF 270, and/or SCS 295. In some implementations, MTC-IWF 270, SCS 295, etc., may use the mode or status of UE 210 to decide if the user plane data should be transmitted towards UE 210. This may be of significance if, for instance, SGW buffering is small and MTC-IWF 270, SCS 295, etc., could lose user plane data when sending data while UE 210 is in a power saving mode.

Figure 8:
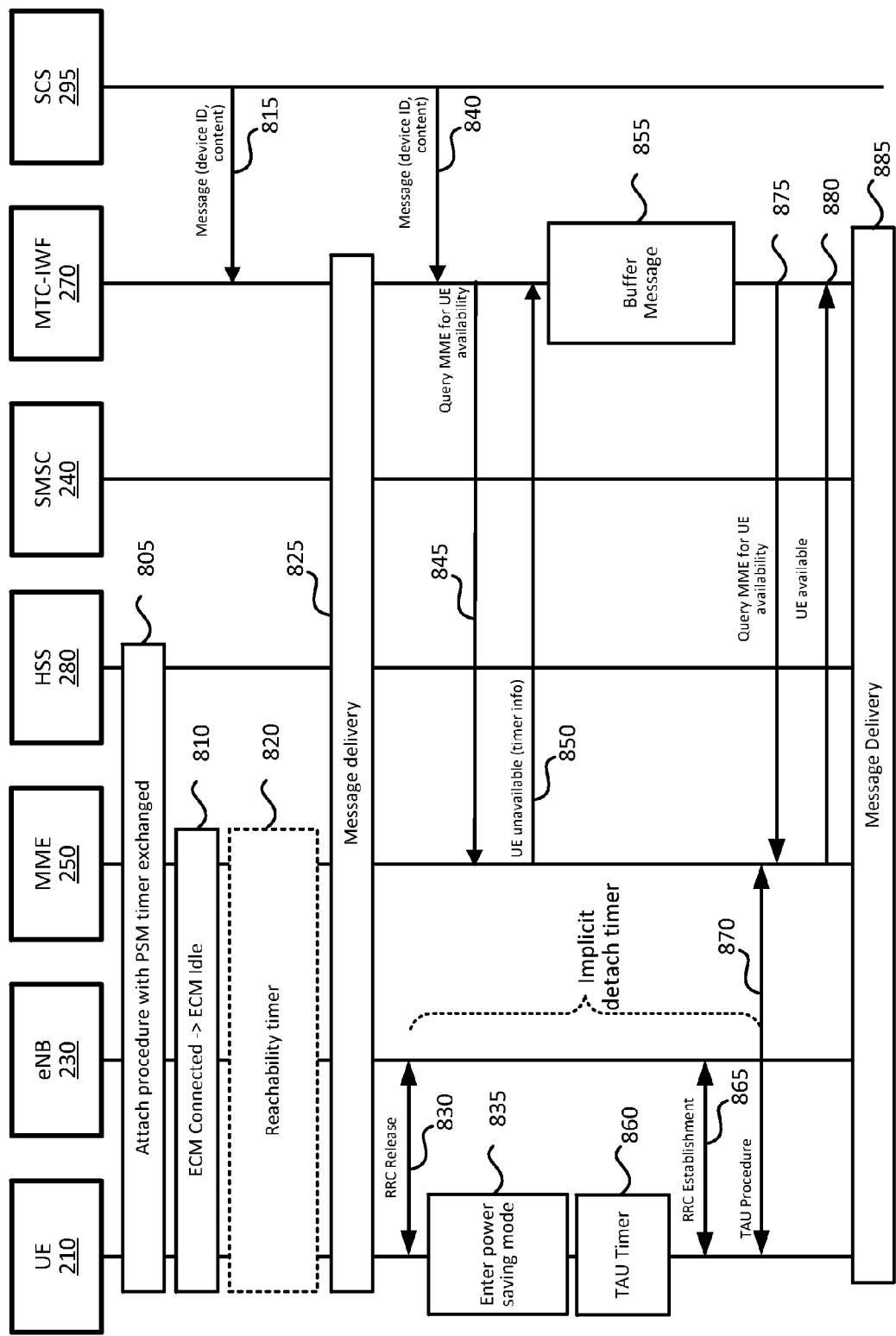
FIG. 8 is a signal flow diagram illustrating another example of moderating communications within a wireless network based on a power saving mode of a UE.

FIG. 8 is a signal flow diagram illustrating an example of moderating communications within wireless network 220 based on a power saving mode of UE 210. The signal flow diagram of FIG. 8 may be a representation of moderating communications with a query-type approach to UE availability. Additionally, in FIG. 8, the functionality of UE mode server 255 has been incorporated into MME 250, and the functionality of information transfer server 275 has been incorporated into MTC-IWF 270, in order to illustrate how the functionality of UE mode server 255 and information transfer server 275 may be integrated into other types of network devices.

As shown in FIG. 8, an attachment procedure may be performed (block 805) in order to connect UE 210 to a wireless network (e.g., wireless network 220). During the attachment procedure, UE 210 and MME 250 may establish conditions and durations for UE 210 being in an active mode and a power saving mode. For instance, UE 210 and MME 250 may establish a reachability timer representing the amount of time between UE 210 entering an idle mode and UE entering a power saving mode. The reachability timer may begin with a particular event, such as UE 210 transitioning from an EPS Connection Management (ECM) CONNECTED state to an ECM IDLE state. Similarly, UE 210 and MME 250 may establish a power saving mode timer representing the amount of time UE 210 may remain in a power saving mode before returning to an active mode (which may be marked by one or more events such as UE 210 establishing an RRC connection and initiating a TAU procedure).

At some point after the attachment procedure, UE 210 may undergo a transition from an ECM CONNECTED state to an ECM IDLE state (block 810). During an ECM CONNECTED state, UE 210 may be registered with MME 250 and have an active RRC connection with wireless network 220. During an ECM IDLE state, UE 210 may still be registered with MME 250 but the RRC connection with wireless network 220 may be idle. Entering the ECM IDLE state may initiate the reachability timer for UE 210 (block 815). At some point during the ECM IDLE state of UE 210, SCS 295 (or another device) may decide to send information to UE 210. As such, SCS 295 may communicate a message to MTC-IWF 270, which may include a device identifier (ID) of UE 210 and message content (line 820). Since the message is being sent during the reachability timer (e.g., before UE 210 has entered a power saving mode), the message may be sent to UE 210 (block 825).

Once the reachability timer has expired, UE 210 may undergo an RRC Release procedure (line 830) and may enter a power saving mode (block 835). While MME 210 is in the power saving mode, SCS 295 may determine to send an additional message to UE 210 (line 840). As such, SCS 295 may send a message, which may include an identifier of UE 210 and message content, to MTC-IWF 270, and MTC-IWF 270 may query MME 250 as to the availability of UE 210 to receive the message (line 845). With UE 210 in a power saving mode, MME 250 may respond to MTC-IWF 270 with an indication that UE 210 is unavailable. MME 250 may also provide MTC-IWF 270 with timing information (line 850). The timing information may include an amount of time (e.g., an implicit detach timer) that UE 210 is expected to remain unavailable. For instance, the timing information describing an estimated time between the RRC Release procedure (line 830) and the TAU procedure (line 870). In response, MTC-IWF 270 may temporarily buffer the message from SCS 295 (855). In other implementations, MTC-IWF 270 may relay the unavailability status of UE 210 and the timing information to SCS 295 along with a command to send the message again later.

At some point, UE 210 may exit the power saving mode, which (as shown) may be followed by a TAU timer (block 860). Upon expiration of the TAU timer, UE 210 may reestablish an RRC connection (line 865) and initiate a TAU procedure with MME 270 (line 870), in accordance with the timing information provided to MTC-IWF 270 from MME 250. As such, MTC-IWF 270 may submit another query to MME 250 regarding the availability of UE 210 (line 875), and MME 250 may respond with a confirmation that UE 210 is indeed available to receive the information (line 880). In response, MTC-IWF 270 may send the message to UE 210 (block 885). In implementations where MTC-IWF 270 did not buffer the message from SCS 295, the second query to MME 295 may originate from SCS 295, and MTC-IWF 270 may relay the UE availability message from MME 250 to SCS 295 along with a command to communicate the message to UE 210.

In some implementations, the example depicted in FIG. 8 may include additional, fewer, and/or alternative devices/entities than those depicted. For instance, in some implementations, a user plane data path may be created that involves an SGW, PGW, MTC-IWF 270, and/or SCS 295. In some implementations, MTC-IWF 270, SCS 295, etc., may use the mode or status of UE 210 to decide if the user plane data should be transmitted towards UE 210. This may be of significance if, for instance, SGW buffering is small and MTC-IWF 270, SCS 295, etc., could lose user plane data when sending data while UE 210 is in a power saving mode.

Figure 9:
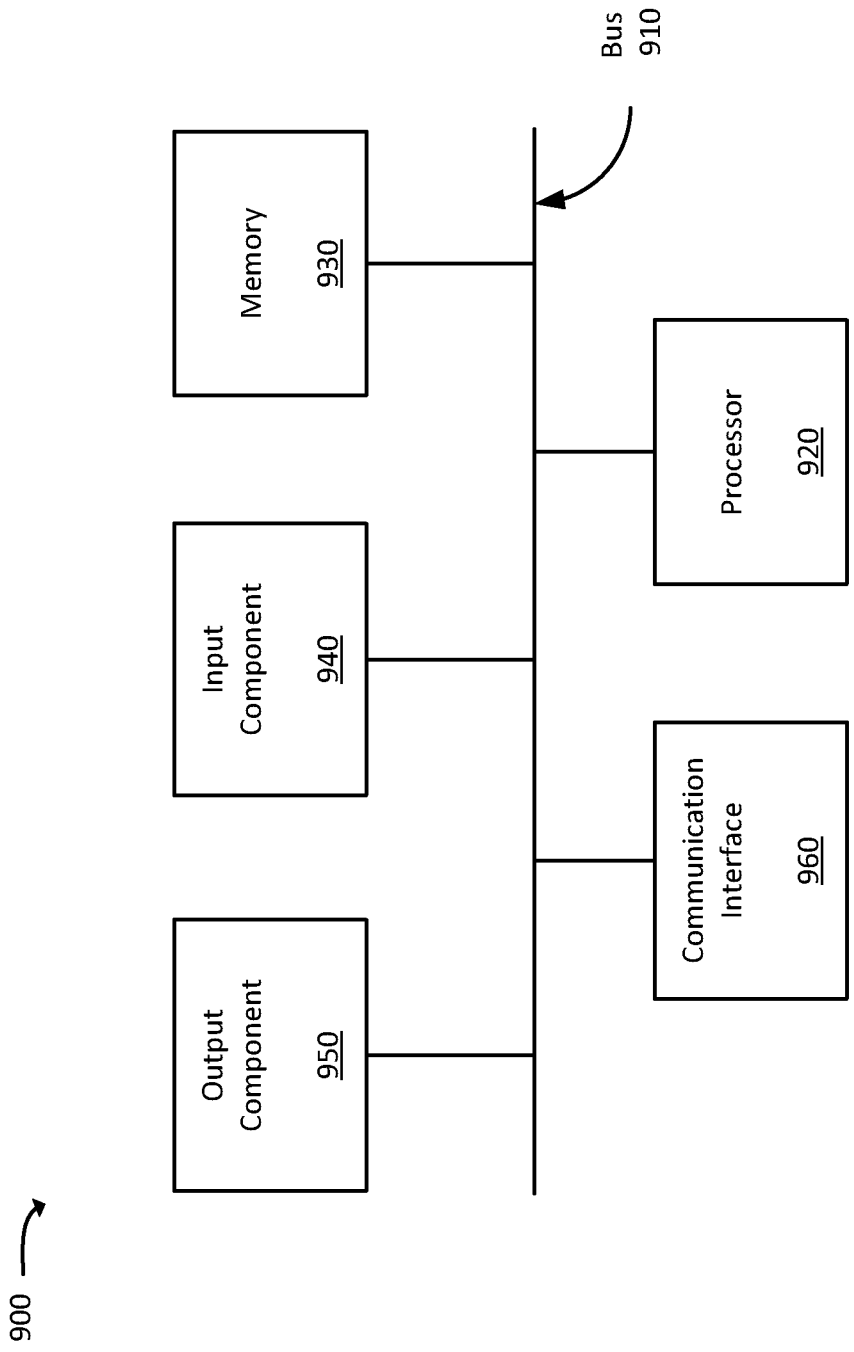
FIG. 9 is a diagram of example components of a device.

FIG. 9 is a diagram of example components of a device 900. Each of the devices illustrated in FIGS. 1, 2, 7, and 8 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 3-6, the order of the blocks may be modified in other implementations. Further, non-dependent blocks may be performed in parallel. Similarly, while series of communications have been described with regard to FIGS. 7 and 8, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device comprising:
   a memory to store processor-executable instructions; and
   processing circuitry to execute the processor executable instructions to:
   receive, from a UE connected to a wireless telecommunications network, an indication of an operational mode corresponding to the UE, the UE operational mode including an idle mode or a second operational mode, and the second operational mode being different than the idle mode;
   receive, from another network device, a request for an availability of the UE to receive information, the request including an identifier of the UE;
   determine, in response to the request for the availability of the UE and based on the identifier of the UE, the operational mode of the UE;
   when the operational mode of the UE is the idle mode, notify the other network device that the UE is available to receive the information via the wireless telecommunications network, and
   when the operational mode of the UE is the second operational mode,
   notify the other network device that the UE is unavailable to receive the information via the wireless telecommunications network;
   receive, from the other network device, a request to provide an ongoing subscription service to notify the other network device regarding changes to the operational mode of the UE, the changes to the operational mode including
   changes from the idle mode to the second operational mode, and
   changes from the second operational mode to the idle mode; and
   establish the subscription service, for the other network device.

2. The network device of claim 1, wherein the network device includes, or is communicatively coupled to, a Mobility Management Entity (MME).

3. The network device of claim 1, wherein the other network device includes, or is communicatively coupled to, a Machine Type Communications Interworking Function (MTC-IWF) server.

4. The network device of claim 1, further comprising processing circuitry to:
   provide, when the other network device is notified that the UE is unavailable to receive the information, the other network device with an expected duration for the UE remaining unavailable.

5. The network device of claim 4, further comprising processing circuitry to:
   receive, after an expiration of the expected duration, and from the other network device, another request for the availability of the UE.

6. The network device of claim 4, wherein the expected duration for the UE remaining unavailable is based on, at least one of:
   an expected duration for the UE to remain in a power saving mode of the second operational mode; or
   an expected duration for the UE to complete a Tracking Area Update (TAU) procedure with respect to the wireless telecommunications network.

7. The network device of claim 1,
   wherein the information is sent to the UE via the wireless telecommunications network in response to the UE being available to receive the information, and
   wherein the information is not sent to the UE via the wireless network in response to the UE being unavailable to receive the information.

8. The network device of claim 1, further comprising processing circuitry to:
   determine the operational mode of the UE based on at least one of:
   a reachability timer,
   an Radio Resource Control (RRC) procedure,
   a Tracking Area Update (TAU) procedure,
   a TAU timer, or
   a pre-selected power saving mode duration.

9. The network device of claim 7, wherein the information is sent to the UE from the other network device.

10. A method performed by a network device, the method comprising:
    receiving, from another network device, a request for an ongoing subscription service to notify the other network device regarding changes to an availability status of a User Equipment (UE) managed by the network device, the request including an identifier of the UE;
    determining, in response to the request for the subscription to the availability status of the UE and based on the identifier of the UE, a current operational mode of the UE, the operational mode including an idle mode or a second operational mode, and the second operational mode being different than the idle mode;
    when the current operational mode of the UE is idle mode, notifying the other network device that the UE is available to receive the information via the wireless telecommunications network, and
when the current operational mode of the UE is a second operational mode,
notifying the other network device that the UE is unavailable to receive the information via the wireless telecommunications network;
monitoring, in accordance with the ongoing subscription, changes to the operational mode of the UE; and
notifying, based on the ongoing subscription, the other network device when that the UE changes from the second operational mode to the idle mode and when the UE changes from the idle mode to the second operational mode.

11. The method of claim 10, wherein the network device includes, or is communicatively coupled to, a Mobility Management Entity (MME).

12. The method of claim 10, wherein the other network device includes, or is communicatively coupled to, a Machine Type Communications Interworking Function (MTC-IWF) server.

13. The method of claim 10,
wherein the information is sent to the UE via the wireless telecommunications network in response to the UE being available to receive the information, and
wherein the information is not sent to the UE via the wireless network in response to the UE being unavailable to receive the information.

14. A server device, comprising:
a non-transitory memory device storing a plurality of processor-executable instructions; and
a processor configured to execute the processor-executable instructions, wherein executing the processor-executable instructions causes the processor to:
receive, from another server device, a request to send information to a User Equipment (UE) connected to a wireless telecommunications network, the request including an identifier of the UE;
send, to another server device managing the UE for the wireless telecommunications network, a request for an availability status of the UE to receive the information, the availability status being based on whether the UE is in an active mode of operation, which includes the UE being in an idle mode, or a power saving mode of operation, which includes the UE having released all radio resource control (RRC) connections;
receive, in response to the query, the availability status of the UE; and
when the availability status corresponds to the UE being in the active mode of operation,
enable the information to be sent to the UE via the wireless telecommunications network, and
when the availability status corresponds to the UE being in the power saving mode of operation,
prohibit the information from being sent to the UE via the wireless telecommunications network,
receive, from the other server device, a request to provide an ongoing subscription service to notify the other server device regarding changes to the operational mode of the UE, the changes to the operational mode including:
changes from the idle mode to the second operational mode, and
changes from the second operational mode to the idle mode; and
establish the subscription service, for the other server device.

15. The server device of claim 14,
wherein the service device includes a Machine Type Communications Interworking Function (MTC-IWF), and
wherein the other network device includes a Mobility Management Entity (MME).

16. The server device of claim 14, wherein executing the processor-executable instructions further causes the processor to:
receive the information intended for the UE; and
store the information in a local buffer.

17. The server device of claim 16, wherein, to enable the information to be sent to the UE, the processor-executable instructions causes the processor to:
send the information stored in the local buffer to the UE via the wireless telecommunications network.

18. The server device of claim 14, wherein, to enable the information to be sent to the UE, the processor-executable instructions causes the processor to:
send, to the other server device, a command to send the information to the UE via the wireless telecommunications network.

19. The server device of claim 14, wherein, to prohibit the information from being sent to the UE via the wireless telecommunications network, the processor-executable instructions causes the processor to:
send, to the other server device, a command not to send the information to the UE via the wireless telecommunications network.

20. The server device of claim 14, wherein the server device is to proactively notify the other server device, in accordance with the ongoing subscription, via push notifications.

* * * * *